United States Patent [19]

Hamilton, Jr.

[11] Patent Number: 4,640,764
[45] Date of Patent: Feb. 3, 1987

[54] SELECTIVE TRICYCLIC HYDROGENATION AND CRACKING PROCESS AND CATALYST SUITABLE FOR SUCH HYDROCONVERSION

[75] Inventor: David M. Hamilton, Jr., Houston, Tex.

[73] Assignee: Shell Oil Company, Houston, Tex.

[21] Appl. No.: 831,884

[22] Filed: Feb. 24, 1986

[51] Int. Cl.$^4$ .............................................. C10G 47/04
[52] U.S. Cl. ..................................... 208/110; 208/143; 208/144; 208/177; 585/841
[58] Field of Search ............... 208/110, 143, 144, 111, 208/112, 177; 585/268, 258, 841

[56] References Cited

U.S. PATENT DOCUMENTS

| 3,244,616 | 4/1966 | Dedinas et al. | 208/110 |
| 3,344,200 | 9/1967 | Wald et al. | 585/268 |
| 3,471,582 | 10/1969 | Lupfer | 208/143 |
| 3,663,425 | 5/1972 | Pollitzer | 208/110 |
| 3,719,719 | 3/1973 | Amidon et al. | 208/143 |
| 4,115,463 | 9/1978 | Murtha | 585/268 |
| 4,176,090 | 11/1979 | Vaughan et al. | 252/455 Z |
| 4,216,188 | 8/1980 | Shabria et al. | 423/118 |
| 4,224,458 | 9/1980 | Grey et al. | 585/268 |
| 4,238,364 | 12/1980 | Shabtal | 252/455 R |
| 4,248,739 | 2/1981 | Vaughan et al. | 252/455 R |
| 4,271,043 | 6/1981 | Vaughan et al. | 252/455 R |
| 4,371,727 | 2/1983 | Gavin | 208/144 |
| 4,436,832 | 3/1984 | Jacobs et al. | 502/84 |
| 4,500,417 | 2/1985 | Chen et al. | 208/111 |
| 4,515,901 | 5/1985 | Elattar | 502/63 |
| 4,531,014 | 7/1985 | Gregory et al. | 585/415 |

Primary Examiner—John Doll
Assistant Examiner—Anthony McFarlane
Attorney, Agent, or Firm—Kimbley L. Muller

[57] ABSTRACT

The invention disclosed herein is a method of treating middle distillate hydrocarbons to selectively convert tricyclic hydrocarbons to hydrocarbons of better cetane value by means of hydrogenation and cracking. The process is performed in the presence of an intercalated clay catalyst having high temperature stable pillars intermediate layers of the clay. This process achieves a diesel fuel having a higher cetane value than is currently obtainable utilizing molecular sieve catalysts such as a metal impregnated Y zeolite. The tricyclic aromatics are selectively hydrogenated and cracked in preference to accompanying paraffins, isoparaffins, tetralins and decalins.

25 Claims, No Drawings

SELECTIVE TRICYCLIC HYDROGENATION AND CRACKING PROCESS AND CATALYST SUITABLE FOR SUCH HYDROCONVERSION

FIELD OF INVENTION

As the aromatic characteristics of refinery feedstocks increases it is becoming more difficult to achieve target specifications for diesel fuel cetane quality at current economic costs. If the target specifications are not achieved in the preparation of a diesel fuel, then lighter more valuable components must be blended to achieve the target specifications before a retail sale is permitted. The field of this invention concerns a cost effective method of achieving cetane quality of a diesel fuel in an efficient manner. It has surprisingly been found that an intercalated clay catalyst support with catalytic hydrogenation/dehydrogenation and cracking metal or metals existent therein is unexpectedly selective for enhancing cetane qualities.

Other attempts at ring openings of multi-aromatic hydrocarbons present in middle distillate fuels have yielded only modest improvements in cetane quality. Isomerization has also been found not to be a viable vehicle within which to enhance cetane properties. A problem confronted by most refiners is that the conventional conversion of tricyclic materials acts to convert isoparaffinic materials to less desirable compounds such that an actual destruction of cetane values will result from an attempt to convert tricyclic materials.

BACKGROUND OF INVENTION

The catalysts of this invention comprise catalytic metals held within synthetically layered clays having synthetic high temperature stable pillars separating the layers of clays. This acts to selectively sandwich the catalytic metals. In 1979, U.S. Pat. No. 4,176,090 issued to Vaughan et al relating to a stable pillared interlayered clay composition arrived at by reacting smectite type clays with polymeric cationic hydroxy metal complexes. See also U.S. Pat. Nos. 4,271,043 and 4,248,739. A specific example of a polymeric cationic hydroxide metal complex is aluminum chlorohydroxide. After preparation, the sandwiched layers are spaced by a distance of 9 to 12 angstroms having high temperature stable pillars so that the particular interlayered clay can be used in high temperature reactions such as catalytic cracking, hydrocracking, hydrotreating, isomerization, and reforming, etc. without undo depreciation. The interlayered clays are also disclosed as molecular sieve absorbents. In the examples of this patent, the prepared interlayered clays are shown to possess advantageous hydrocracking activities with improved hydrothermal stability. The absorptive qualities of the pillared interlayered clays are also demonstrated.

Montmorillonites crosslinked with aluminum hydroxide or chromium hydroxide are disclosed as molecular sieves in U.S. Pat. No. 4,216,188, issued to Shabria et al. The presence of a reactive structural hydroxide group on the surface of the crosslinking component is taught as being particularly significant in regard to an increase in catalytic activity in esterification rates. In U.S. Pat. No. 4,238,364, issued in 1980 to Shabtai, a molecular sieve cracking catalyst is prepared by partially crosslinking smectites with hydrogen or rare-earth elements. One contemplated conversion using this catalyst is modification of heavy liquids, such as native black oils and petroleum resids to distillate products such as gasoline. In Examples 3 and 4, a catalytic cracking process is exemplified wherein 1-isopropylnaphthalene is converted to another hydrocarbon material at a rate approaching 5 to 6 times the conversion rate obtained utilizing a stabilizing HY-type zeolite.

In Elattar, U.S. Pat. No. 4,515,901, an interlayered pillared clay is formed utilizing a soluble carbohydrate and a soluble pillaring agent. The pillaring agent is preferably a metal or organometallic compound which is soluble in water, alcohol or another polar solvent. Useful carbohydrates include simple carbohydrates such as monosaccharides and oligosaccharides. The advantage of this invention is that the carbohydrate is eliminated during heating and is not necessary to the proper functioning of a pillard interlayered clay as it performs its catalytic support function. Use of the prepared catalyst is shown in a process for the production of alcohols from carbon monoxide and hydrogen. In Jacobs et al, U.S. Pat. No. 4,436,832, issued in 1984, a process is set forth for the preparation of bridged clays suitable as catalysts or catalyst supports for the conversion of paraffins or olefinic hydrocarbons, wherein the clay suspension is subjected to dialysis during preparation. Example 5 exemplifies a process for hydroisomerization and hydrocracking of normal decane to more volatile hydrocarbons. In Gregory et al, U.S. Pat. No. 4,531,014, a process is described utilizing a cation-exchangeable clay for the conversion of aliphatic linear olefins to a product comprising a hydrocarbon having a higher carbon number such as dimers, oligomers, etc.

Recognition has been made in U.S. Pat. No. 4,510,257, assigned to the assignee of interest herein, that intercalated clays can be selectively used to crack hydrocarbons as a derivative of the relatively large angstrom size separating the pillared clay layers. The specific catalytic cracking embodiment demonstrates that a silicon pillared cerium bentonite catalyst possesses cracking activity for a hydrotreated light catalytic cracking feed.

The above references depict many methods of preparation of the interlayered pillared clay material. Recognition has also been made that such interlayers may advantageously be used as a molecular sieve or for catalytic reaction purposes. There has, however, been no recognition that catalytic hydroconversion, inclusive of aromatic hydrogenation and catalytic cracking, can be selectively achieved to crack tricyclic compounds, in preference to other compounds present in a middle distillate fuel such as decalins, tetralins, paraffins and isoparaffins.

OBJECTS AND EMBODIMENTS

An object of this invention is to provide a process for upgrading cetane values in diesel fuel without resort to light end blending.

Another object of this invention is to provide a process for the selective conversion of tricyclic hydrocarbon materials to hydrocarbon materials having fewer than three ring members by selective hydrogenation and selective cracking of tricyclic hydrocarbons in the presence of two-ring hydrocarbons and aliphatic hydrocarbons without substantially reducing the molecular size of the latter.

Another object of this invention is to provide a process for the conversion of middle distillate fuels to selectively improve their cetane value by reduction of tricyclic hydrocarbon materials.

Another object of this invention is to provide a diesel fuel distillate having a relatively high cetane value at a reduced cost.

In one aspect an embodiment of this invention resides in a process for the selective hydrocracking and hydrogenation of a hydrocarbon distillate boiling in the range of from 300° to 700° F. to upgrade the cetane value of the distillate by contacting the distillate with a metal-containing intercalated clay at hydrocracking conditions.

Yet another embodiment of this invention resides in the selective conversion of tricyclic hydrocarbons within a hydrocarbon distillate boiling in the range of 300° to 700° F. and containing normal paraffins, isoparaffins, tetralins, decalins and said tricyclic hydrocarbons by contact of the distillate at hydroconversion conditions, with a pillared bentonite clay having channels formed therein as a result of pillaring of the clay by a pillaring agent and wherein the openings between the pillared layers contain a metal chosen from Group VIII, Group VIB and combinations of metals of Group VIII and Group VIB.

BRIEF DESCRIPTION OF THE INVENTION

This invention sets forth a selective hydrocracking and hydrogenation process for the selective conversion of tricyclic hydrocarbon materials present in a middle distillate hydrocarbon fuel to elevate the cetane quality of the resultant middle distillate fuel. The process utilizes a heat stable pillared interlayered clay support having catalytic metals residing therein.

DETAILED DESCRIPTION OF THE INVENTION

The process of this invention resides in the selective conversion of tricyclic hydrocarbons to the exclusion of bicyclic hydrocarbon materials, normal paraffins and isoparaffins, all contained in a middle distillate fuel, to elevate the cetane value of the middle distillate fuel. The presence of tricyclic hydrocarbons is detrimental to cetane quality of middle distillate fuels. Elimination or reduction of tricyclic hydrocarbons in a hydrocarbon distillate fuel increases cetane quality.

A retailer of diesel fuel must meet target specifications of the market place in order to sell the product to consumers. If these specifications are not achieved during formation or treatment of the diesel fuel, then blending, with lighter, more valuable components (such as straight run kerosene or heavy naphtha) is necessary to elevate cetane values to meet such target specifications. This is an unacceptable cost to all refiners if it is not absolutely necessary. It has surprisingly been found that utilization of a heat stable interlayered clay catalyst support having specific metals incorporated therein will result in an increase in cetane values of as much as 25% or more; this is an extremely large and unexpected increase in relative cetane values.

The instant invention is applicable to all hydrocarbon middle distillate fuels boiling in the range of 300° to 700° F. with a preferred boiling range between 300° to 515° F. or 390° to 660° F. inclusive of diesel fuels, turbine fuels and kerosene. The basic components of these type of middle distillates are paraffins, isoparaffins, decalins, tetralins and tricyclic hydrocarbon materials such as pyrene, anthracene, acetonaphthalene, bicycloparaffinic substituted benzene, etc. (See Tables 3 and 6.) It has surprisingly been found that selective catalytic cracking and hydrogenation occur as a derivative of select competitive absorption of the tricyclic components vis-a-vis the remainder of the hydrocarbon components of the middle distillate. The openings or channels in the layers of clay are defined by the pillars perpendicularly interconnecting same. The channel distance is usually between 9 and 20 angstroms, which would seem to indicate that all of the components of a diesel fuel will enter the channels of the layered clay. However, for a yet unknown reason, it has surprisingly been discovered that only tricyclic materials are competitively absorbed into the catalytic metal sites in a selective manner. This results in selective hydrogenation and cracking of the tricyclics to molecules of lesser molecular weight to the exclusion of the other hydrocarbons. It is reasonably believed (but not yet proven) that if there is an absence of tricyclic hydrocarbons, then other bicyclic hydrocarbon materials, such as decalins or tetralins, will be selectively absorbed and thereby cracked and hydrogenated. Regardless, at least in the presence of tricyclic materials, the other members which make up this distillate material, have proven to remain relatively unchanged during selective cracking and hydrogenation of the tricyclics. This cracking and hydrogenation may be exemplified by the following two conversions.

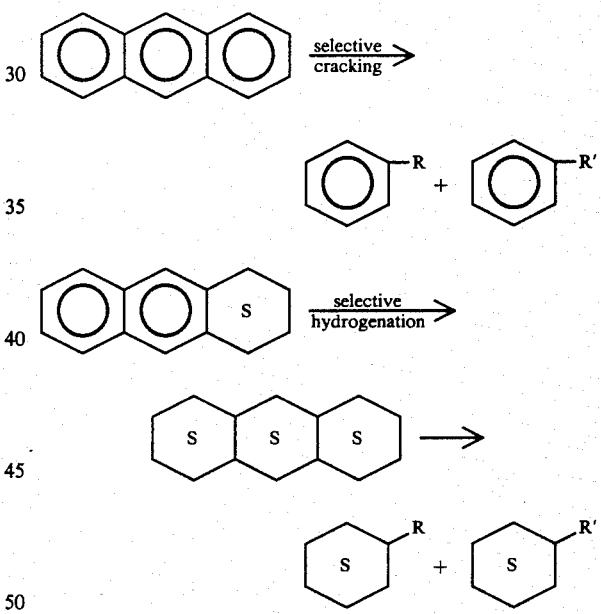

where R and R' are either paraffinic or isoparaffinic moieties.

The process of this invention is undertaken at a temperature of from about 300° to about 700° F., a hydrogen pressure of from about 700 to 2100 psig and a hydrogen content of from 30 to 75 standard cubic feet per barrel (SCFB).

The process is conducted in the presence of a metallic cracking and/or a hydrogenation catalyst held within the channels of the support. These catalytic metals are positioned or placed within the channels of the interlayered clays. Metals or metal compounds from Group VIII and Group VIB may be used individually or in conjunction with one another. Specific examples of such metals include nickel, cobalt, iron, platinum, palladium, osmium, ruthenium, iridium, rhodium, platinum and palladium from Group VIII, and chromium, molybdenum and tungsten from Group VIB. It is preferred that a combination of these metals may be utilized such as platinum-palladium, nickel-tungsten, platinum-chromium, palladium-molybdenum, cobalt-tungsten, iridium-molybdenum, ruthenium-chromium-molybdenum, platinum-molybdenum-chromium, ruthenium-tungsten-chromium, rhodium-osmium-molybdenum, etc. The catalyst should be contacted with the hydrocarbon feed for a time represented by a weight hourly space velocity (WHSV) of 0.5 to 2.5 with the specific quantity of catalytic metal ranging from 0.5 weight percent to 10 weight percent. And, again the above catalytic materials are present between fungible layers of clay separated by high temperature stable pillars.

The advent of these types of interlayered clays has opened up a new horizon of viable catalyst supports, which are known to be useful for certain reactions such as intrasorption and catalytic reactions of bulky or medium sized organic molecules, such as coal derived material and multiaromatic molecules. While it is expected that relatively large size organic molecules will penetrate these channels of the layered clay, it was surprising that the tricyclic materials were competitively absorbed and selectively cracked and hydrogenated in deference to the bicyclic materials, such as tetralins and decalins and, in deference to normal paraffin and isoparaffin hydrocarbons, the latter two usually having between 10 and 18 carbon atoms. The interlayered clay may be any clay with high temperature stable pillars such as discussed above in the above Background of this Invention. The specific silica-clay complexes, as disclosed and claimed in U.S. Pat. No. 4,510,257, were utilized in the hereinafter Illustrative Embodiment which exemplifies the surprising conversion of the tricyclic materials. This intercalated clay is pillared with a silicon pillaring agent. The description set forth at columns 3-7 of U.S. Pat. No. 4,510,257 issued to Lewis et al, is hereby incorporated by reference in regard to how to make and develop these type of pillared intercalated clays. Other techniques for preparing other intercalated clays, such as set forth in Vaughan et al, U.S. Pat. Nos. 4,176,090, 4,248,739, Shabria et al 4,216,188, Shabtai 4,238,634, Elattar 4,515,901 and Jacobs et al 4,436,832, are also herein specifically incorporated by reference as other equally viable methods of producing such clays. This invention includes and encompasses all high stable pillared clays without regard to their method of pillaring.

While it is not dispositive to the overall selective cracking and hydrogenation function of this process in re how the interlayered clay materials are prepared (as long as they have high temperature stable pillars intermediate the layers of clay,) it is important that the layers of clay be segregated apart at a specific distance. The layers of clay should be spaced from at least 6 to as much as 20 angstroms (7 to 10 preferred) in order to have a viable process.

A specific example of this type of interlayered clay is bentonite clay intercalated by an aluminum chloride hydrate pillaring agent followed by ion exchange of a metal salt to inure the catalytic metal to the specific channels.

ILLUSTRATIVE EMBODIMENT

This illustrative embodiment shows a method of preparing a particular type of intercalated clay material and the surprising significant improvements in cetane quality derived from selective cracking and aromatic saturation of the tricyclic hydrocarbons contained therein.

A 50:50 solution of aluminum chlorohydrate and water were heated to 70° C. and added to 150 grams of cerium bentonite. After admixture, the clay was placed in a vessel and subjected to overnight heating at 110° C. After recovery the dried clay was ground into fine particles. Three catalysts were prepared from the clay by loading the catalyst with platinum metal by ion exchange using $Pt(NH_3)_4Cl_2$ which resulted in catalysts having the following physical properties:

TABLE 1

|  | Catalyst A | Catalyst B | Catalyst C |
| --- | --- | --- | --- |
| Pt content | 1.1 wt % | 1.0 wt % | 1.0 wt % |
| Aluminum pillared agent to cerium ion (Al/Ce) | .33 Al/1 Ce | 0.67 Al/1 Ce | 1 Al/1 Ce |

These three catalysts were tested at reactor temperatures of 500° F. to 530° F. maintained at a level sufficient to result in 60% conversion of the feed to product boiling below 510° F. Relative to one another very little difference in catalyst activity was found. A loss of diesel fuel product relative to the feed was determined, however, most of the product remained in the middle distillate boiling range of 350° F. to 650° F. As a corollary, product loss to gasoline, a definite negative in the preparation of a diesel fuel, was found to be relatively small.

To determine the quantity of improvement of diesel fuel cetane quality, these three catalysts were tested using an initial feed material having the following distillation and cetane value numbers.

TABLE 2

| DISTILLATION CUTS °F. | API GRAVITY @ 60° F. | WT PERCENT YIELD | CETANE NUMBER |
| --- | --- | --- | --- |
| IBP-390 | 35.6 | 5.3 | * |
| 390-455 | 30.4 | 22.8 | 26.9 |
| 455-510 | 28.1 | 22.7 | 27.3 |
| 510-575 | 24.9 | 24.3 | 31.6 |
| 575-625 | 21.8 | 14.1 | 33.1 |
| 625-650 | 20.0 | 5.2 | 35.1 |
| 650+ | 17.8 | 5.0 | 33.2 |

CETANE NUMBER OF 390° F.-650° F. COMPOSITE = 29.6.
CETANE REFERENCE = DECALIN — 36.9.

The feed was cut into several fractions in order to determine the cetane number related to the molecular composition of the feed. This is set forth in Table 3.

TABLE 3

| | HIGH RESOLUTION MASS SPECTRAL HYDROCARBON ANALYSIS FOR FEED MATERIAL | | | | | |
| --- | --- | --- | --- | --- | --- | --- |
| HYDROCARBON TYPE | Z NUMBER | 390° F.-455° F. | 455° F.-510° F. | 510° F.-575° F. | 575° F.-625° F. | 625° F.-650° F. |
| PARAFFIN | +2 | 11.2 | 14.8 | 18.0 | 20.3 | 20.6 |

TABLE 3-continued

| HIGH RESOLUTION MASS SPECTRAL HYDROCARBON ANALYSIS FOR FEED MATERIAL | | | | | | |
|---|---|---|---|---|---|---|
| HYDROCARBON TYPE | Z NUMBER | 390° F.–455° F. | 455° F.–510° F. | 510° F.–575° F. | 575° F.–625° F. | 625° F.–650° F. |
|  | 0 | 19.2 | 24.7 | 29.6 | 26.8 | 26.6 |
| 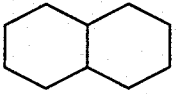 | −2 | 45.4 | 23.6 | 17.8 | 14.5 | 14.2 |
| 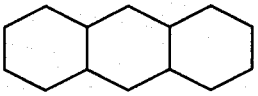 | −4 | 2.9 | 6.3 | 5.9 | 4.6 | 2.5 |
|  | −6 | 4.8 | 2.5 | 1.4 | 1.1 | 1.1 |
| 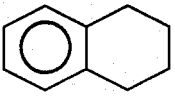 | −8 | 15.4 | 24.1 | 13.9 | 3.3 | 1.6 |
|  | −10 | 0.3 | 0.8 | 4.9 | 8.6 | 5.3 |
| 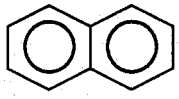 | −12 | 0.7 | 2.9 | 5.6 | 3.6 | 2.7 |
| 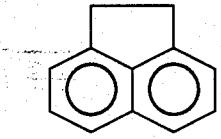 | −14 | * | 0.2 | 2.8 | 13.1 | 15.0 |
| 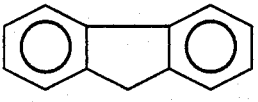 | −16 | * | 0.1 | 0.2 | 2.9 | 6.6 |
| 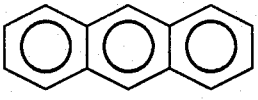 | −18 | * | * | * | 1.2 | 3.5 |
| 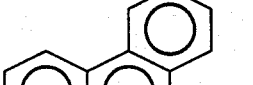 | −20 | * | * | * | * | 0.2 |
|  | | | | | | |

*NOT OBSERVED.

The aromatic tricyclic hydrocarbons have Z numbers lower than −12 and higher than −20. Decalins, tetralins and naphthalenes have Z numbers of −2, −8 and −12, respectively. Paraffinic hydrocarbons have a Z number of +2. It should be noted that the 575° F.–625° F. and 625° F.–650° F. fractions contain significant quantities of tricyclic (Z=−14) hydrocarbons which are detrimental to cetane quality; yet, as shown in Table 2, these fractions surprisingly have relatively high cetane values. One possible explanation for this aberration is that the monocyclic aromatics and dicyclic naphthenes existent in these cuts may have long aliphatic side chains which can substantially improve cetane quality even with the tricyclic materials present. Another feasible explanation is that higher cetane quality is derivative of a large concentration of paraffins in the heavy ends which may offset the negative effects of the tricyclic components. Notwithstanding, the three catalysts above prepared were tested in an attempt to improve cetane fuel qualities for the fuel of Table 2. The feed material was contacted in the presence of these catalysts at an LHSV of 2, a hydrogen pressure of 1500 psig, a hydrogen to oil ratio of 16:1, and a hydrogen flow rate equal to 57 liters per hour which is equal to 8,000 SCF/BBL. The results of these tests are set forth in Table 4.

spectral hydrocarbon analysis was made for the product of Catalyst B and is set forth in Table 6 with the feed material being parenthetically set forth.

This data exemplifies the surprising effect that catalytic conversion by cracking is small, albeit cracking of the tricyclic feed is present; a much heavier emphasis is placed on hydrogenation of the hydrocarbon as a primary reaction pathway for conversion of the tricyclic aromatics. In two of the heaviest product fractions (575° F.–625° F. and 625° F.–650° F.) the tricyclic aromatics ($Z = -14$) have been extensively converted resulting in a large increase in product cetane quality. However, in the 510°–575° F. fraction, the total amount of tricyclic naphthenes ($Z = -10$) has increased substantially as a result of the cascading of the saturated tricyclic aromatics into this lower boiling fraction. Notwithstanding, the cetane quality of the 510°–575° F. boiling fraction is unexpectedly increased to a level

TABLE 4

| CATALYST | FEED | CATALYST A | CATALYST B | CATALYST C |
| --- | --- | --- | --- | --- |
| % YIELD 390°–650° PRODUCT | 90.1 | 80.7 | 80.9 | 74.1 |
| % YIELD PRODUCT >350° F. | 99.3 | 95.4 | 94.6 | 96.0 |
| C WT % | 88.15 | 86.42 | 86.90 | 86.67 |
| H WT % | 11.79 | 13.49 | 13.00 | 13.30 |
| CETANE NUMBER[1] OF 350° F.–650° F. PRODUCT | 29.6 | 41.8 | 42.2 | 43.5 |

[1]MINIMUM CETANE SPECIFICATION = 40.

This data shows a surprisingly increased cetane value for Catalyst A, B and C versus the original cetane value of the feed. All cetane values derived from treatment with the platinum impregnated interlayered clay were inured with unexpectedly high cetane qualities above target specifications. In order to further analyze the results achieved in this case, the product produced from Catalyst B was analyzed in detail. This analysis is set forth in Table 5 as follows with feed data being shown parenthetically.

above target specifications, i.e. 40.0. In conclusion, this data shows that current diesel fuel is hydrocracked and hydrogenated to selectively eliminate tricyclic feed components.

In the lightest two fractions, hydrogenation rather than cracking is clearly the predominant reaction mechanism. For example, in the 455°–510° F. fraction, the number of tetralins ($Z = -8$) is reduced while the number of dicyclic naphthenes ($Z = -2$) is increased. Again, the tricyclic naphthenes ($Z = -4$) increase is attributed

TABLE 5

| DISTILLATION AND CETANE NUMBER DATA FOR PRODUCT OF CATALYST B | | | | | |
| --- | --- | --- | --- | --- | --- |
| DISTILLATION CUTS °F. | API GRAVITY @ 60° F. | WT. PERCENT YIELD | CETANE NUMBER | Δ CETANE NUMBER | YIELD RELATIVE TO FEED |
| IBP–390 | 39.9 (35.6) | 15.6 (5.3) | * | * | 2.94 |
| 390–455 | 33.8 (30.4) | 21.7 (22.8) | 34.4 (26.9) | 7.1 | 0.95 |
| 455–510 | 31.9 (28.1) | 22.0 (22.7) | 36.7 (27.3) | 9.4 | 0.97 |
| 510–575 | 29.0 (24.9) | 23.6 (24.3) | 41.0 (31.6) | 9.4 | 0.97 |
| 575–625 | 21.8 (28.2) | 9.4 (14.1) | 45.5 (33.1) | 12.4 | 0.67 |
| 625–650 | 20.0 (30.1) | 3.2 (5.2) | 51.4 (35.1) | 16.3 | 0.62 |
| 650+ | 17.8 (30.9) | 3.5 (5.0) | * | * | 0.70 |

*NOT MEASURED.
FEED DATA ARE SHOWN PARENTHETICALLY.
CETANE NUMBER CATALYST B COMPOSITE = 42.2.
CETANE REFERENCE = DECALIN = 36.5.

This data show that the greatest improvement in cetane quality occurs in the heaviest end of the feed and then the amount of relative increase begins to decrease as the product becomes lighter. The heavier ends also appear to have been hydroconverted to a much larger extent than the lighter fractions. The conversion data must also be analyzed with the knowledge that hydrogenation and/or cracking of the hydrocarbons results in a cascading of hydrocarbon products to a lower boiling fraction. In furtherance thereof, a high resolution mass to the cascading of the hydrogenated products from higher boiling fractions. In the fraction boiling between 390°–455° F., a large increase is noted in the number of decalins ($Z = -2$) and a decrease in total tetralins ($Z = -8$), while cetane quality is improved by the smallest amount of all the product fractions. In summation, the cetane value of the higher boiling fractions are more improved versus the smaller, yet unexpected improvement achieved in the lower boiling fractions.

TABLE 6

| HIGH RESOLUTION MASS SPECTRAL HYDROCARBON ANALYSIS FOR CATALYST B | | | | | | |
| --- | --- | --- | --- | --- | --- | --- |
| HYDROCARBON TYPE | Z NUMBER | 390° F.–455° F. | 455° F.–510° F. | 510° F.–575° F. | 575° F.–625° F. | 625° F.–650° F. |
| PARAFFIN | +2 | 9.0 (11.2) | 16.3 (14.8) | 18.7 (18.0) | 27.6 (20.3) | 33.5 (20.6) |

TABLE 6-continued

HIGH RESOLUTION MASS SPECTRAL HYDROCARBON ANALYSIS FOR CATALYST B

| HYDROCARBON TYPE | Z NUMBER | 390° F.–455° F. | 455° F.–510° F. | 510° F.–575° F. | 575° F.–625° F. | 625° F.–650° F. |
|---|---|---|---|---|---|---|
|  | 0 | 16.1 (19.2) | 18.5 (24.7) | 17.6 (29.6) | 19.9 (26.8) | 17.8 (26.6) |
| 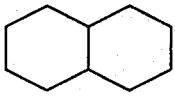 | −2 | 60.1 (45.4) | 30.2 (23.6) | 14.3 (17.8) | 16.0 (14.5) | 16.5 (14.2) |
| 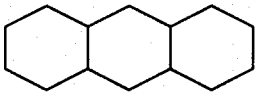 | −4 | 3.3 (2.9) | 17.9 (6.3) | 33.3 (5.9) | 13.6 (4.6) | 8.8 (2.5) |
|  | −6 | 4.9 (4.8) | 4.7 (2.5) | 3.4 (1.4) | 4.8 (1.1) | 3.8 (1.1) |
| 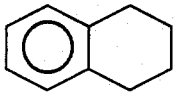 | −8 | 6.3 (15.4) | 11.0 (24.1) | 7.0 (13.9) | 2.5 (3.3) | 1.8 (1.6) |
| 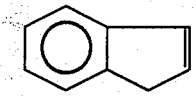 | −10 | * (0.3) | 0.3 (0.8) | 3.6 (4.9) | 10.9 (8.6) | 7.9 (5.3) |
| 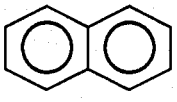 | −12 | * (0.7) | 0.4 (2.9) | 0.9 (5.6) | 2.1 (3.6) | 4.8 (2.7) |
| 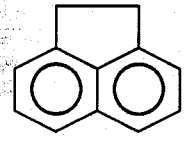 | −14 | * * | 0.3 (0.2) | 0.7 (2.8) | 1.4 (13.1) | 1.6 (15.0) |
| 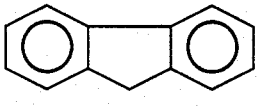 | −16 | * * | 0.4 (0.1) | 0.3 (0.2) | 0.5 (2.9) | 1.2 (6.6) |
| 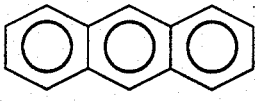 | −18 | * * | * * | 0.2 (*) | 0.3 (1.2) | 0.8 (3.5) |
| 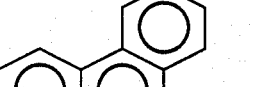 | −20 | * * | * * | * * | 0.4 (*) | 0.2 (0.2) |

*NOT OBSERVED.

I claim as my invention:

1. A selective hydrocracking and hydrogenation process to upgrade the cetane value of a hydrocarbon distillate boiling in the range of from 300° to 700° F. and containing $C_{10}$ to $C_{18}$ normal paraffins, $C_{10}$ to $C_{18}$ iso-paraffins, tetralins, decalins and undesirable tricyclic hydrocarbons which process comprises contacting said hydrocarbon distillate with a catalytic metal or metals containing intercalated clay at hydrocracking and hydrogenation conversion conditions to selectively crack said tricyclic hydrocarbons in preference to said $C_{10}$ to $C_{18}$ normal paraffins, $C_{10}$–$C_{18}$ isoparaffins, tetralins and decalins and to produce a hydrocarbon distillate having an increased cetane value.

2. The process of claim 1 wherein said hydrocarbon distillate is selected from the group consisting of a kerosene fuel, a turbine fuel and a diesel fuel.

3. The process of claim 2 wherein said diesel fuel has a boiling point of from 300° to 550° F. and wherein said increase in said cetane value is greater than 10 percent.

4. The process of claim 3 wherein said increase in said cetane value is as high as 25 percent.

5. The process of claim 1 wherein said tricyclic hydrocarbons comprise aromatic, cycloparaffinic and combinations of aromatic and cycloparaffinic molecules.

6. The process of claim 1 wherein said metal containing intercalated clay comprises a synthetically layered bentonite clay.

7. The process of claim 6 wherein said bentonite clay is layered by treatment of natural or synthetic bentonite clay by a layering agent comprising aluminum trichloride hydrate.

8. The process of claim 6 wherein said bentonite clay is layered to form a clay having multiple layers of clay selectively and uniformly separated by a multitude of heat stable pillars.

9. The process of claim 8 wherein said layers of clay are uniformly separated by a distance of from 7 to 10 Å and which are receptive to said catalytic metal or metals.

10. The process of claim 9 wherein said catalytic metal or metals are selected from Group VIII and Group VIB of the Periodic Table.

11. The process of claim 10 wherein said catalytically active metals are a combination of catalytically active metals selected from Group VIII and Group VIB of the Periodic Table.

12. The process of claim 11 wherein said combination of catalytically active metals comprises a combination of metals of Group VIII.

13. The process of claim 10 wherein said Group VIII catalytically active metal is platinum.

14. The process of claim 12 wherein said combination of catalytically active metals comprises platinum and palladium.

15. The process of claim 11 wherein said combination of catalytically active metals selected from Group VIB and Group VIII comprises molybdenum and nickel.

16. The process of claim 1 wherein catalytic metal or metals are placed in said intercalated clay by means of ion exchange or impregnation.

17. The process of claim 1 wherein said catalytic metal or metals is present in a quantity of from about 0.5 to about 10 percent by weight.

18. The process of claim 1 wherein said hydrocracking and hydrogenation conditions comprise a temperature of from about 300° to 700° F., a pressure of from 700 to 2100 psig, a hydrogen content of about 30 to about 75 SCFB and a weight hourly space velocity of from about 0.5 to about 2.5.

19. A process for the selective hydrocracking and hydrogenation of tricylic hydrocarbons in the presence of normal paraffins, isoparaffins, tetralins and decalins which comprises contacting an admixture of said hydrocarbon components, at hydrocracking and hydrogenation conditions, including a temperature of from 300° to 700° F., a hydrogen pressure of from 700 to 2100 psig, a hydrogen content of 30 to 75 SCFB and a weight hourly space velocity of from 0.5 to 2.5, with a pillared bentonite clay having channels formed therein as a result of said pillaring, which channels contain metals having catalytic activity and which are selected from the group consisting of metals chosen from Group VIII, Group VIB and combinations of metals from Group VIII and Group VIB to selectively hydrocrack and hydrogenate said tricyclic hydrocarbons to hydrocarbons having higher intrinsic cetane values in preference to hydrocracking or hydrogenating said normal paraffin, isoparaffin, tetralin and decalin hydrocarbons.

20. The process of claim 19 wherein said tricyclic hydrocarbons comprise triaromatic hydrocarbons and saturated cycloparaffinic substituted naphthalene hydrocarbons and wherein said normal paraffins and isoparaffins possess from 10 to 18 carbon atoms.

21. The process of claim 19 wherein said pillared bentonite clay comprises silica pillars intercalated between layers of an expandable, swelling layer, lattice clay mineral or synthetic analogue thereof, wherein said silica pillars comprise at least two silicon atom layers.

22. The process of claim 19 wherein said intercalated clay has layers separated by a distance of greater than 6 Å.

23. The process of claim 19 wherein said metals selected from the combination of Group VIII and Group VIB comprise nickel and molybdenum.

24. The process of claim 19 wherein said metal selected from Group VIII is platinum.

25. The process of claim 19 wherein said combination of Group VIII metals comprises platinum and palladium.

* * * * *